United States Patent
Clifford et al.

(10) Patent No.: US 10,286,849 B2
(45) Date of Patent: May 14, 2019

(54) CARGO MANAGEMENT SYSTEM INCORPORATING A DYNAMIC LOAD FLOOR AND A SWING ARM ASSEMBLY

(71) Applicant: FORD GLOBAL TECHNOLOGIES, LLC, Dearborn, MI (US)

(72) Inventors: Daniel Clifford, Farmington Hills, MI (US); Ryan Kurrle, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 14/857,113

(22) Filed: Sep. 17, 2015

(65) Prior Publication Data

US 2017/0080869 A1 Mar. 23, 2017

(51) Int. Cl.
*B60R 7/04* (2006.01)
*B60R 5/04* (2006.01)
*B60R 7/02* (2006.01)

(52) U.S. Cl.
CPC .............. *B60R 7/04* (2013.01); *B60R 5/04* (2013.01); *B60R 7/02* (2013.01)

(58) Field of Classification Search
CPC .............. B60R 5/045; B60R 5/04; B60R 7/02
USPC ......... 296/37.16, 26.08, 191, 26.1, 37.1, 24, 296/65.09, 65.16
See application file for complete search history.

(56) References Cited

U.S. PATENT DOCUMENTS

| | | | | |
|---|---|---|---|---|
| 3,627,158 A | * | 12/1971 | Kobasic | B60R 5/04 414/462 |
| 5,669,537 A | | 9/1997 | Saleem et al. | |
| 5,967,054 A | * | 10/1999 | Rosenfeld | B60R 5/045 108/115 |
| 6,050,202 A | * | 4/2000 | Thompson | B60N 3/001 108/144.11 |
| 6,113,172 A | | 9/2000 | Chaloult et al. | |
| 6,702,355 B1 | | 3/2004 | Price et al. | |
| 6,811,196 B2 | * | 11/2004 | Gammon | B60R 5/04 296/37.1 |
| 7,661,742 B2 | * | 2/2010 | Medlar | B60R 5/04 296/37.14 |
| 7,938,471 B2 | * | 5/2011 | Karaki | B60R 5/04 224/542 |
| 7,950,712 B2 | * | 5/2011 | Karaki | B60R 5/04 224/542 |

(Continued)

FOREIGN PATENT DOCUMENTS

DE 102009041233 A1 4/2010
EP 2436561 B1 9/2012

OTHER PUBLICATIONS

English machine translation of DE102009041233A1.

(Continued)

*Primary Examiner* — D Glenn Dayoan
*Assistant Examiner* — Sunsurraye Westbrook
(74) *Attorney, Agent, or Firm* — Vichit Chea; King & Schickli, PLLC

(57) ABSTRACT

A cargo management system is provided for a storage area of a motor vehicle. That cargo management system includes a dynamic load floor, a storage tub and a swing arm assembly connecting the dynamic load floor to the storage tub and allowing the dynamic load floor to be selectively positioned into multiple configurations.

18 Claims, 11 Drawing Sheets

(56) References Cited

U.S. PATENT DOCUMENTS

| | | | | |
|---|---|---|---|---|
| 8,328,264 B2* | 12/2012 | Jackson | ............... | B60R 11/06 |
| | | | | 296/37.14 |
| 8,348,587 B2* | 1/2013 | Fleming | ............... | B60P 7/10 |
| | | | | 224/563 |
| 8,534,736 B1* | 9/2013 | Whalen | ............... | B60R 5/045 |
| | | | | 296/37.14 |
| 8,870,257 B2* | 10/2014 | Tosco | ............... | B60R 5/04 |
| | | | | 296/37.14 |
| 2008/0179907 A1 | 7/2008 | Medlar et al. | | |
| 2009/0108639 A1* | 4/2009 | Sturt | ............... | B60N 2/22 |
| | | | | 297/15 |
| 2014/0049065 A1* | 2/2014 | Tosco | ............... | B60R 5/04 |
| | | | | 296/37.14 |

OTHER PUBLICATIONS

English machine translation of EP2436561B1.
"Chrysler PT Cruiser Cargo Storage Shelf", Chrysler LLC, http://www.chrysler.com/pt_cruiser/features/cargo_storage/shelf, May 21, 2015.

* cited by examiner

US 10,286,849 B2

CARGO MANAGEMENT SYSTEM INCORPORATING A DYNAMIC LOAD FLOOR AND A SWING ARM ASSEMBLY

TECHNICAL FIELD

This document relates generally to the motor vehicle equipment field and, more particularly, to a cargo management system for a cargo area of a motor vehicle.

BACKGROUND

A need exists for a user-friendly cargo management system for a cargo area of a motor vehicle such as behind the rearmost seat in a sport utility vehicle (SUV). That cargo management system must be user-friendly as well as relatively simple and inexpensive to manufacture. That cargo management system must also provide enhanced functionality by being readily positionable in multiple configurations to act as a load floor, a shelf or even a bulkhead to hold or protect cargo from rolling around, rattling and becoming damaged during vehicle operation and thereby better meet user applications. This document relates to just such a cargo management system.

SUMMARY

In accordance with the purposes and benefits described herein, a cargo management system is provided for the storage area of a motor vehicle. The cargo management system comprises a dynamic load floor and a swing arm assembly carrying the dynamic load floor. The swing arm assembly allows the dynamic load floor to be selectively positioned into multiple configurations. Still further, the cargo management system includes a storage tub underlying the dynamic load floor.

More specifically, the swing arm assembly includes a first swing arm having a first end pivotally connected to a first anchor point on the storage tub and a second end pivotally connected to a first edge of the dynamic load floor. Further, this swing arm assembly has a second swing arm having a third end pivotally connected to a second anchor point on the storage tub and a fourth end pivotally connected to a second edge of the dynamic load floor.

In addition, the dynamic load floor includes a first projection on the first edge and the first swing arm includes a first open notch receiving the first projection whereby the first swing arm and the dynamic load floor are held in a single plane. In addition, the dynamic load floor includes a second projection on the second edge and the second swing arm includes a second open notch receiving the second projection and holding the second swing arm and dynamic load floor in that same single plane.

In one possible embodiment, the cargo management system further includes a first hook in a first sidewall of the storage area and a second hook in a second sidewall of the storage area. When the dynamic load floor is pivoted with respect to the swing arm assembly into a second position, oriented at an angle to the first swing arm and the second swing arm to form a shelf, the first projection is received in the first hook and the second projection is received in the second hook. In this manner the hooks function to support the dynamic load floor as a shelf through the sidewalls of the cargo area.

In accordance with yet another possible embodiment, the first hook is pivotally mounted to the first sidewall and displaceable between a stowed position within a first cavity of the sidewall and an extended position to receive the first projection. Similarly, the second hook is pivotally mounted to the second sidewall and displaceable between a stowed position within a second cavity of the second sidewall and an extended position to receive the second projection.

In accordance with yet another possible embodiment, the cargo management system includes a first flipper panel carried vehicle forward of the dynamic load floor between the dynamic load floor and the rear seat of the vehicle. Still further, the cargo management system may include a second flipper panel carried vehicle forward of the dynamic load floor adjacent the first flipper panel in between the dynamic load floor and the rear seat of the motor vehicle. In accordance with still another embodiment, the cargo management system includes a flip up shelf bulkhead pivotally connected to the dynamic load floor and displaceable between a retracted position flat against the dynamic load floor and a deployed position substantially perpendicular to the dynamic load floor. In one possible embodiment, the flip up shelf bulkhead and the swing arm assembly are both pivotally connected to the dynamic load floor at a same end of the dynamic load floor. Thus, the flip up shelf bulkhead may be hidden from view on the dynamic load floor when the flip up shelf bulkhead is in the retracted position and the dynamic load floor is in a closed position overlying, covering and resting on the storage tub. In accordance with still another embodiment, the cargo management system includes a cargo storage door that is pivotally connected to the storage tub at a position vehicle forward of the dynamic load floor. In this embodiment, the first flipper panel is carried vehicle forward of the cargo storage door between the cargo storage door and a rear seat of the motor vehicle.

In the following description, there are shown and described several preferred embodiments of the cargo management system. As it should be realized, the cargo management system is capable of other, different embodiments and its several details are capable of modification in various, obvious aspects all without departing from the cargo management system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification illustrate several aspects of the cargo management system and together with the description serve to explain certain principles thereof. In the drawing figures.

Figure 6:
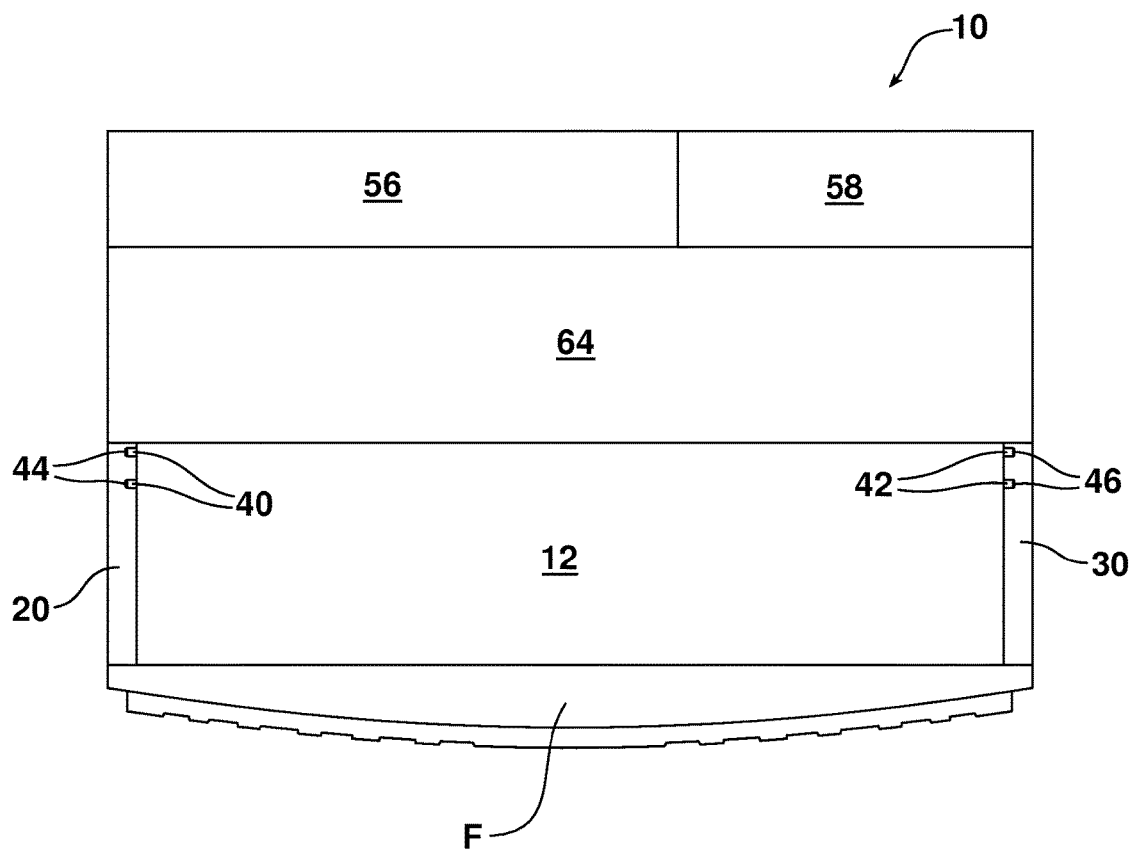
Figure 7:
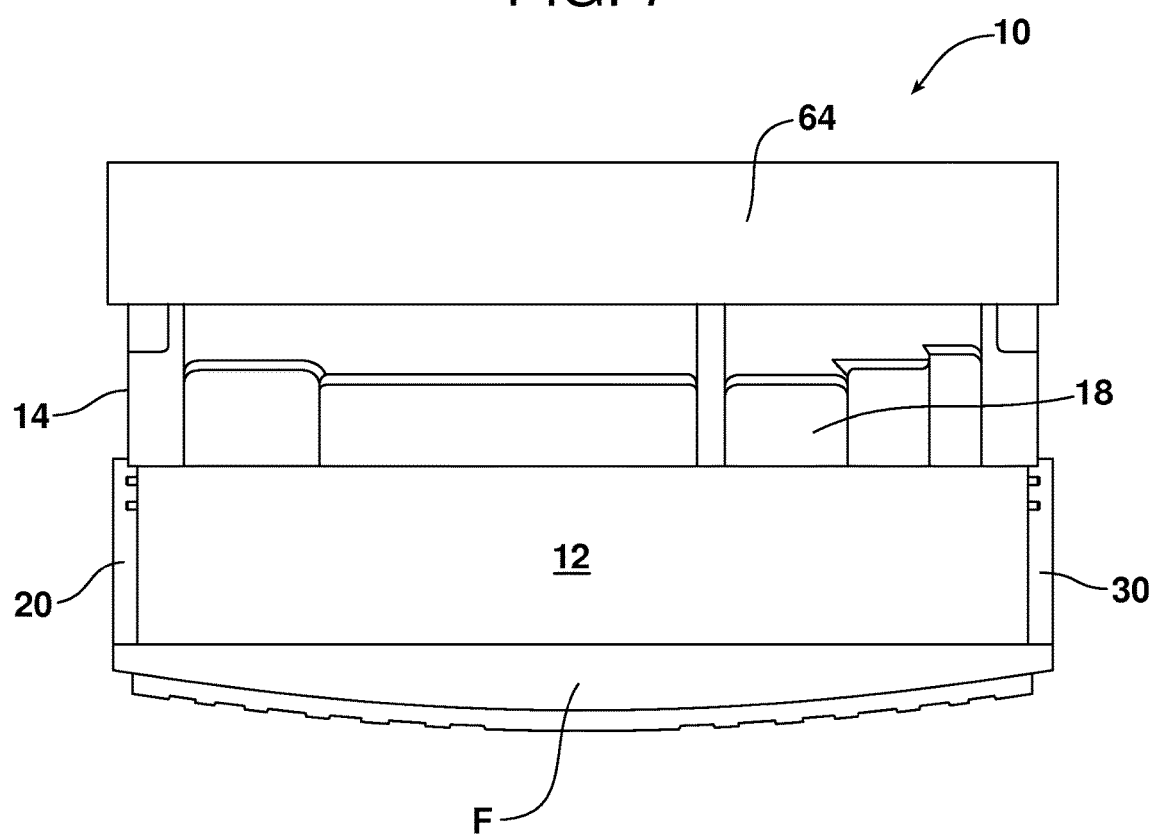
Figure 8:
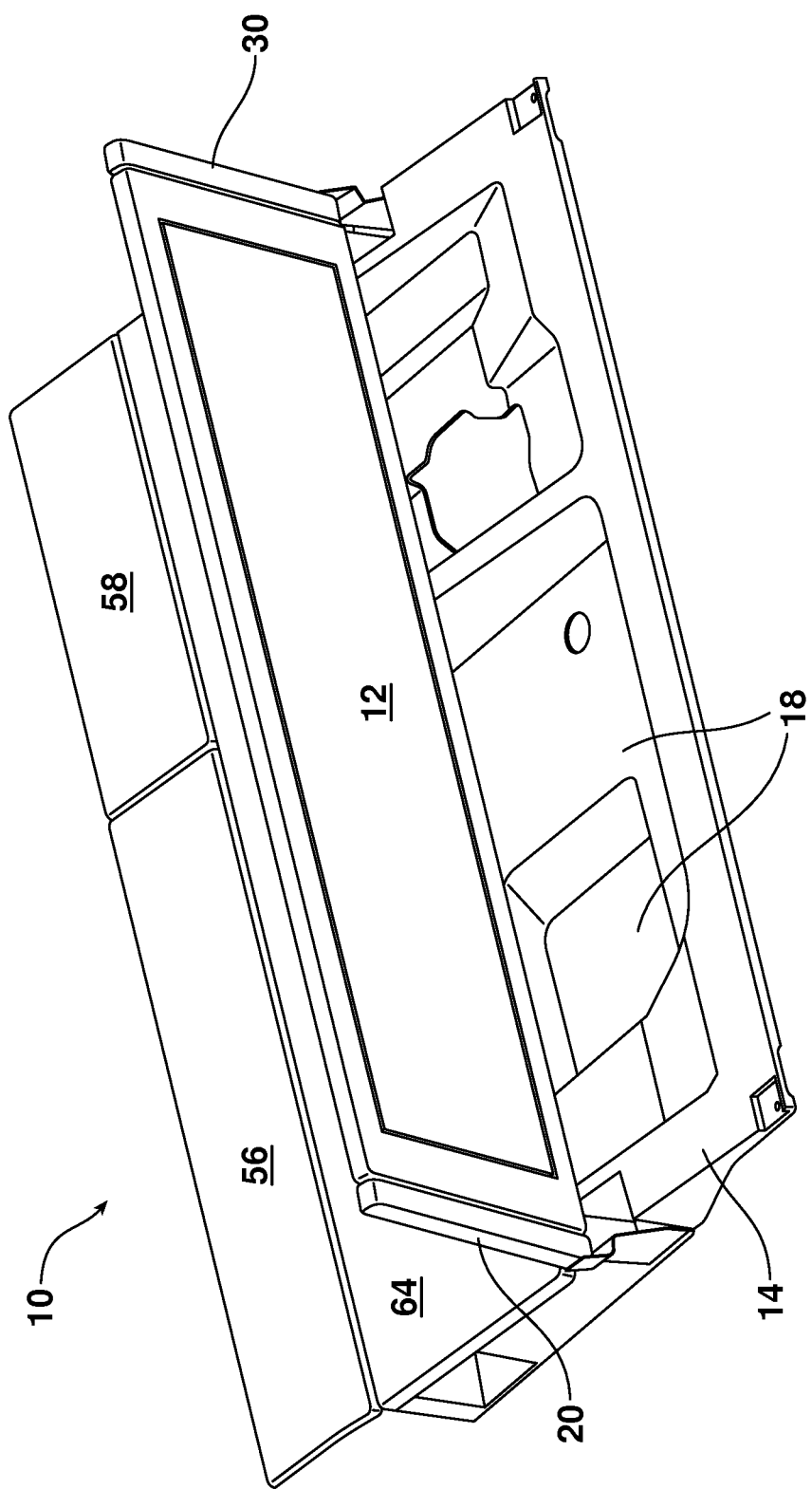
Figure 9:
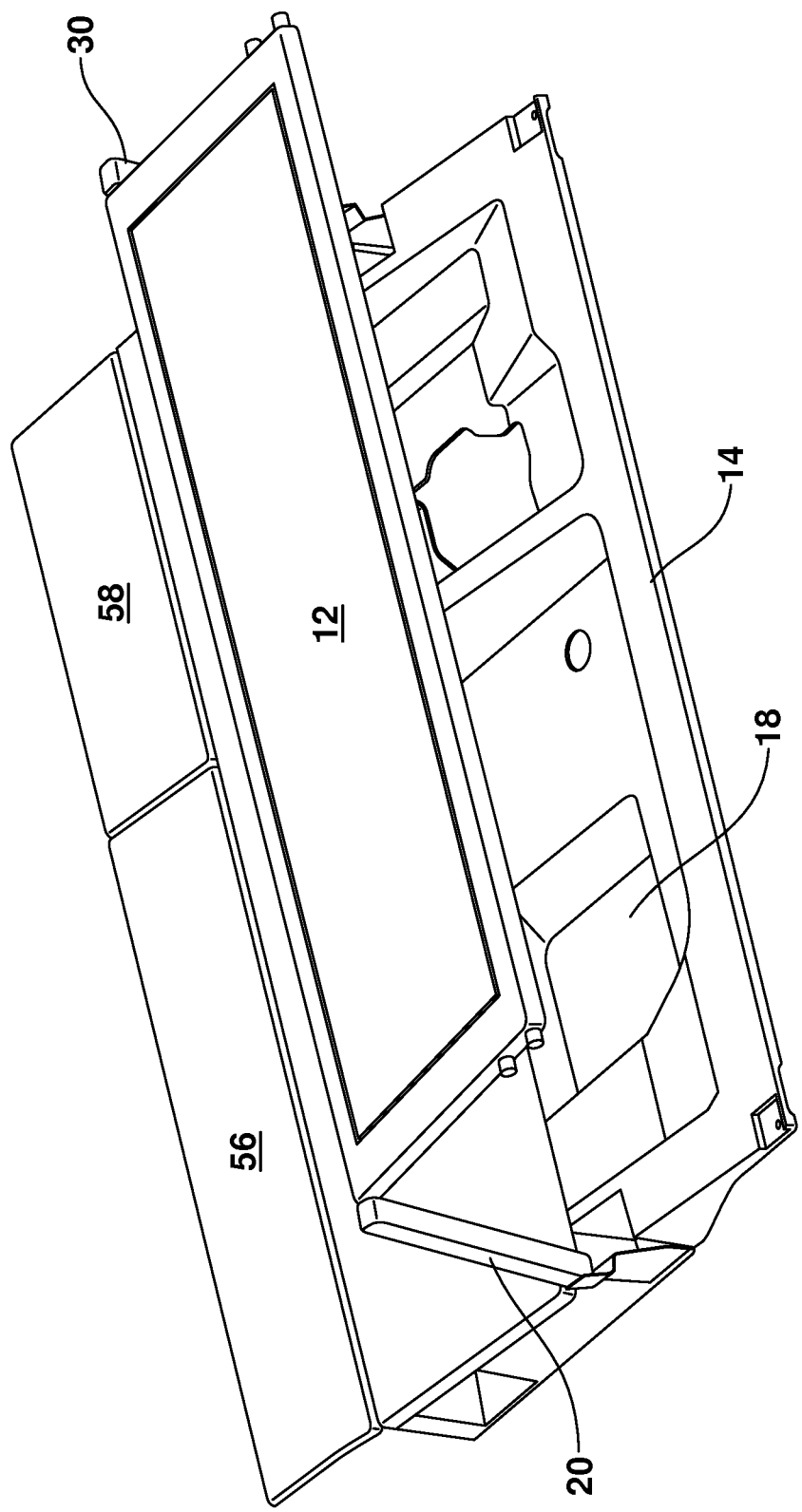

FIGS. 6-9 are various views illustrating a second embodiment of the cargo management system incorporating a cargo storage door between the dynamic load floor and the vehicle forward flipper panels. FIG. 6 is a top plan view illustrating the cargo storage door and dynamic load floor in the closed position concealing the load tub. FIG. 7 is a top plan view illustrating the cargo storage door in the open position exposing the underlying load tub for use. FIG. 8 illustrates the dynamic load floor pivoted forward into a divider or bulkhead position exposing the rear portion of the load tub while the front portion remains covered by the cargo storage door. FIG. 9 shows the dynamic load floor configured as a shelf overlying the exposed storage tub.

Figure 10A:
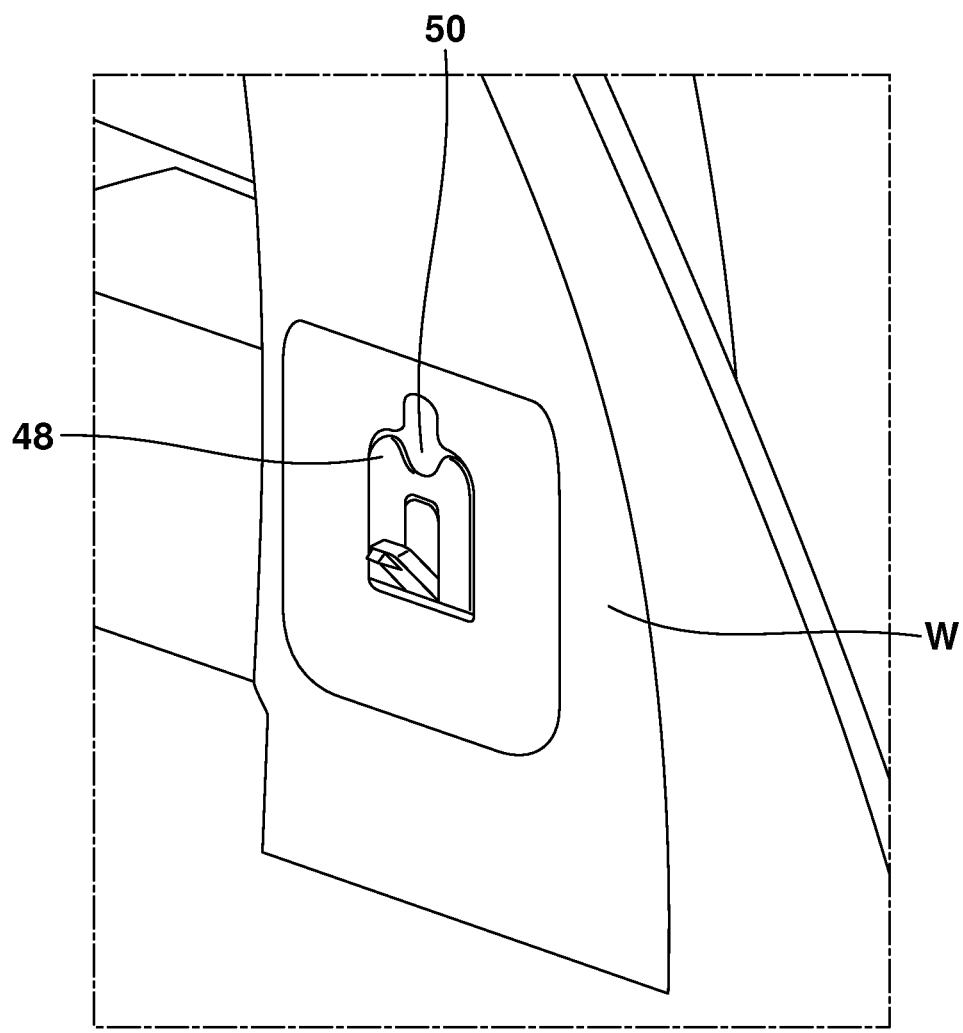
Figure 10B:
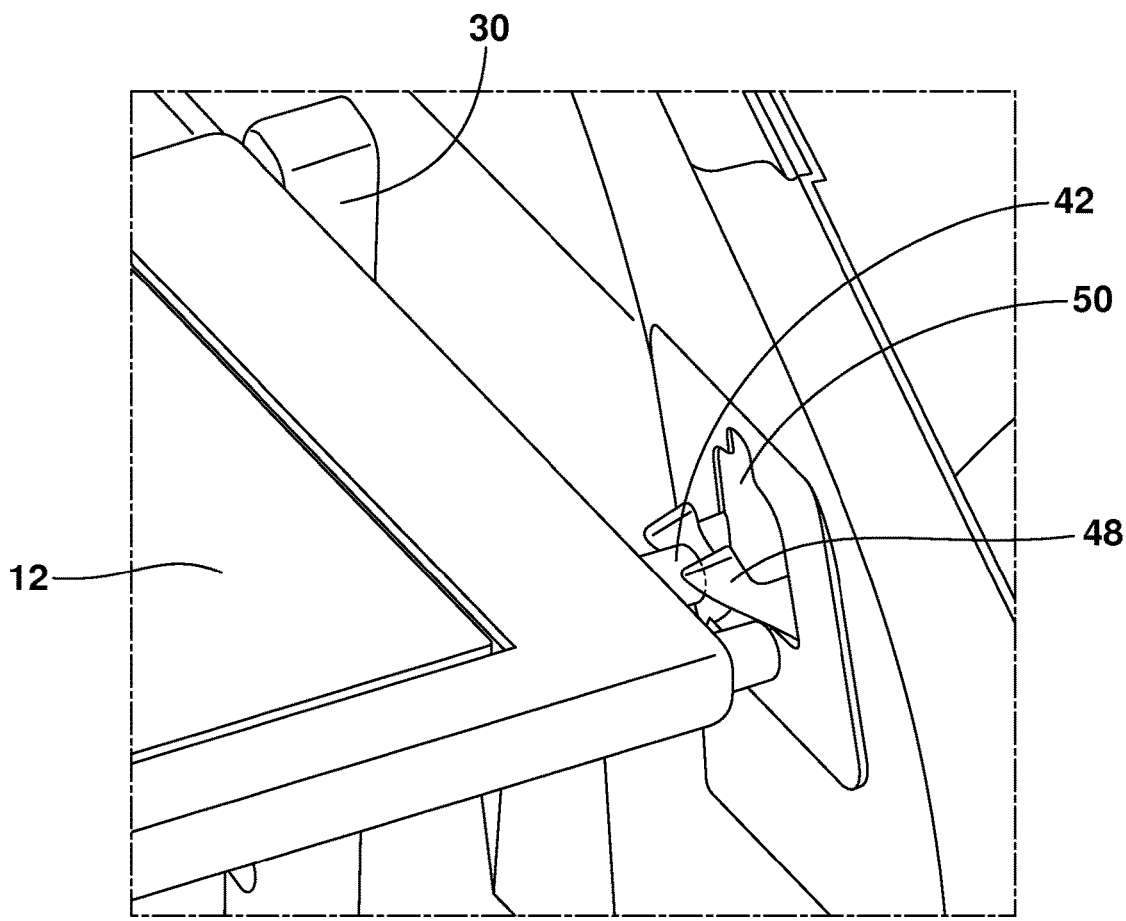

FIGS. 10a and 10b are perspective views illustrating a hook in a sidewall of the motor vehicle in respective stowed and use positions where the hook engages projections on an edge of the dynamic load floor to support and stabilize the load floor when it is in the shelf position.

Reference will now be made in detail to the present preferred embodiments of the cargo management system, examples of which are illustrated in the accompanying drawing figures.

DETAILED DESCRIPTION

Reference is now made to FIGS. 1-5 illustrating a first embodiment of the cargo management system 10. That cargo management system 10 may be generally described as including a dynamic load floor 12, a storage tub 14 and a swing arm assembly 16 connecting the dynamic load floor 12 to the storage tub 14. As will be apparent from the following description, the swing arm assembly 16 allows the dynamic load floor 12 to be selectively positioned into multiple configurations where the load floor can function as a divider or partition, a forward bulkhead, a rearward bulkhead, and/or a shelf.

Figure 1:
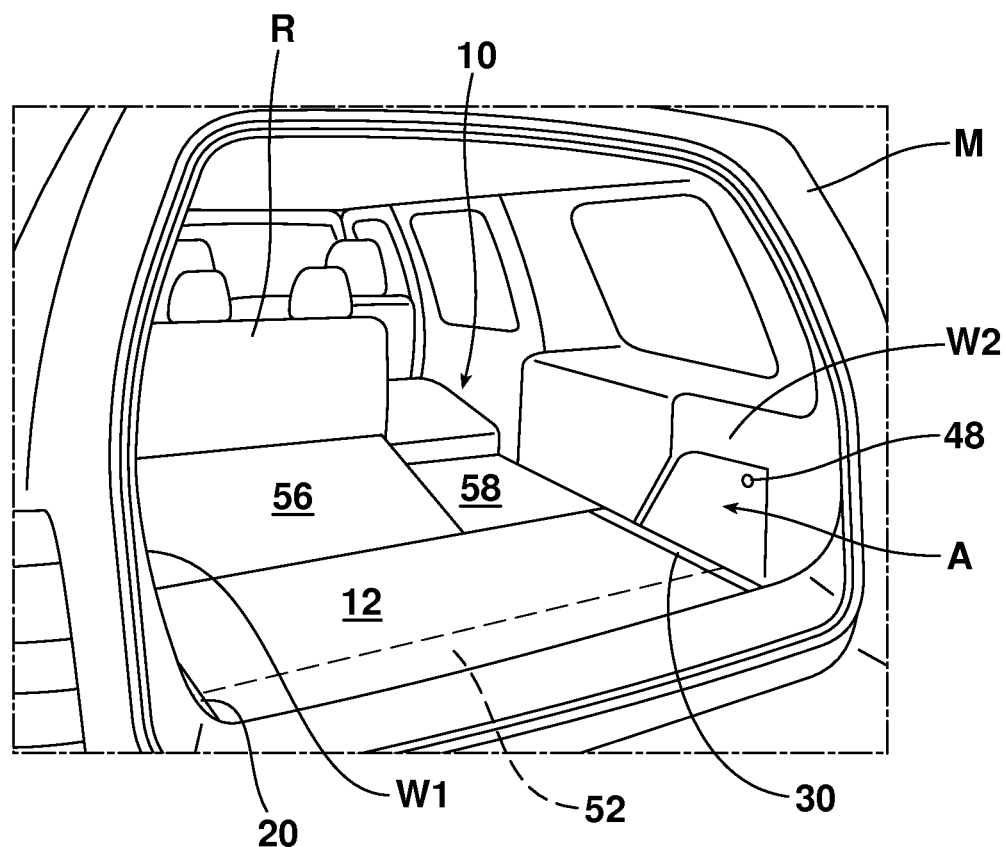
FIG. 1 is a rear perspective view of a motor vehicle equipped with the cargo management system that is the subject matter of this document.

When installed in a motor vehicle M and configured in a first position as illustrated in FIG. 1, the dynamic load floor 12 is flush with the floor F of the storage area A. In this position, the dynamic load floor 12 closes the storage tub 14 which lies immediately below the floor level of the motor vehicle M. Thus, the dynamic load floor 12 may function as an extension of the motor vehicle floor F in the lowermost position, concealing any items stored in the storage compartment 18 formed by the storage tub 14.

As best illustrated in FIGS. 2-5, the swing arm assembly 16 includes a first swing arm 20 having a first end 22 pivotally connected by a pin or other means to a first anchor point 24 on the storage tub 14 and a second end 26 pivotally connected by a pin or other means to a first edge 28 of the dynamic load floor 12. As further illustrated, the swing arm assembly 16 also includes a second swing arm 30 having a third end 32 pivotally connected by a pin or other means to a second anchor point 34 on the storage tub 14 and a fourth end 36 pivotally connected by a pin or other means to a second edge 38 of the dynamic load floor 12.

Figure 2:
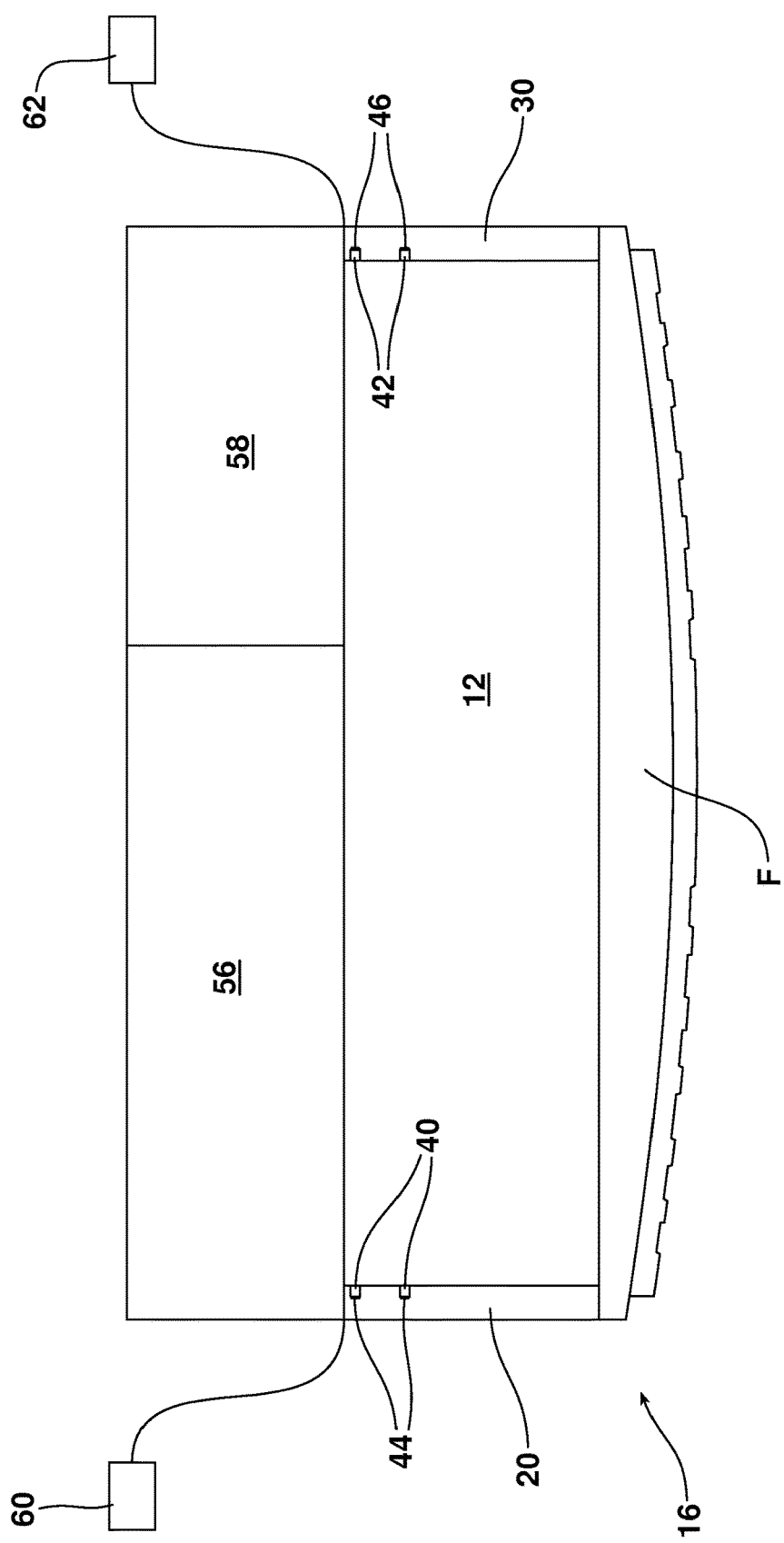
FIG. 2 is a detailed top plan view of a first embodiment of the cargo management system showing (a) the dynamic load floor between the swing arms of the swing arm assembly and (b) the first and second flipper panels vehicle forward of the load floor.
Figure 4:
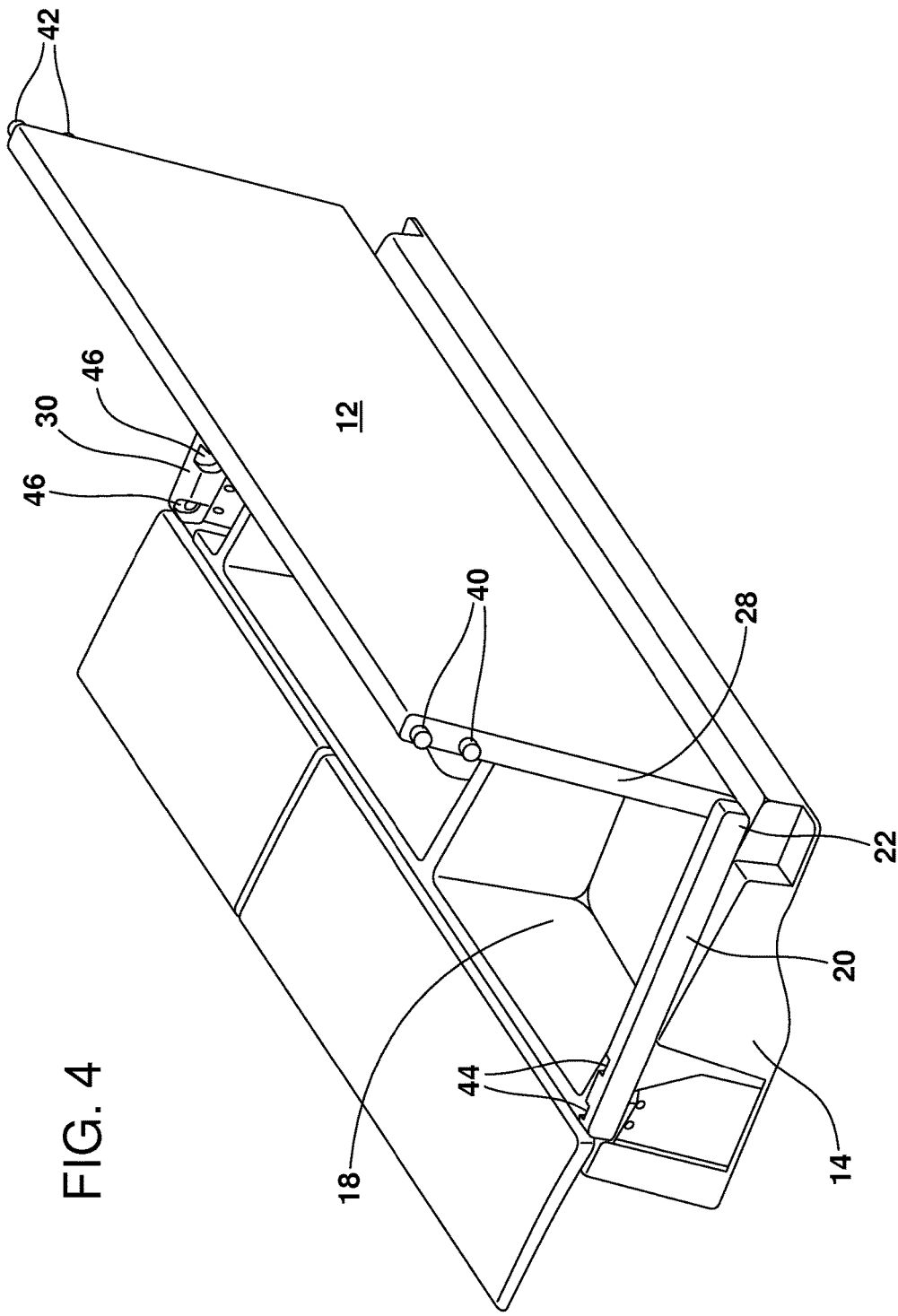
FIG. 4 is another perspective view of the first embodiment illustrating the dynamic load floor pivoted into a vehicle rearward position with the load tub again exposed for use.
Figure 5:
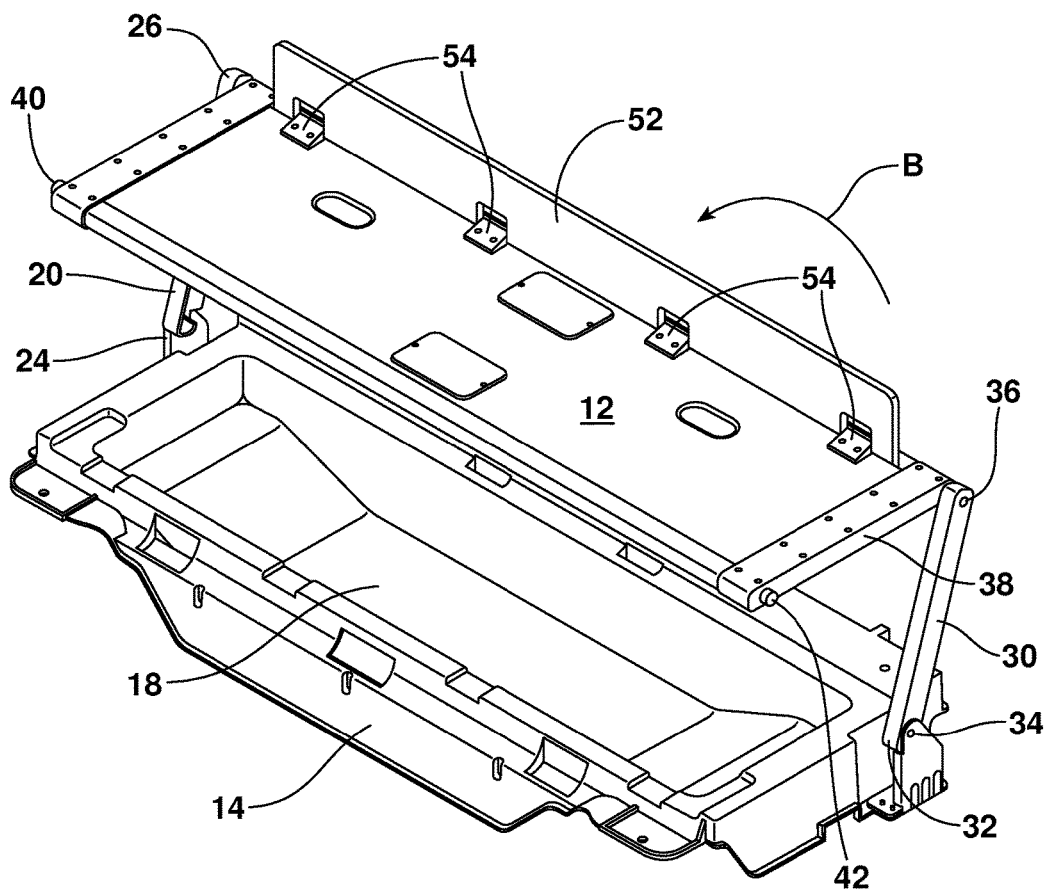
FIG. 5 is a perspective view of the first embodiment of the cargo management system wherein the dynamic load floor has been configured to function as a shelf above the load tub with a flip up shelf bulkhead in the deployed position to function as a forward wall with respect to the dynamic load floor.

As best illustrated in FIGS. 2, 4 and 5, the dynamic load floor 12 also includes a first set of projections 40 on the first edge 28 and a second set of projections 42 on the second edge 38. While each set of projections 40, 42 in the illustrated embodiment includes two projections, it should be appreciated that one, two or more may be provided as desired in order to provide stability and ease of use.

The first swing arm 20 includes a first set of open notches 44 while the second swing arm 30 includes a second set of open notches 46. The number of notches in each set 44, 46 corresponds to the number of projections in each set 40, 42. As illustrated in FIG. 2, when the dynamic load floor 12 is in its lowermost or home position, closing the storage tub 14, the first set of projections 40 are received in the first set of open notches 44 while the second set of projections 42 are received in the second set of open notches 46 so that both ends of the dynamic load floor 12 are held by the swing arms 20, 30 and the swing arms and dynamic load floor fold in the same plane flush with the floor F of the motor vehicle M.

Figure 3:
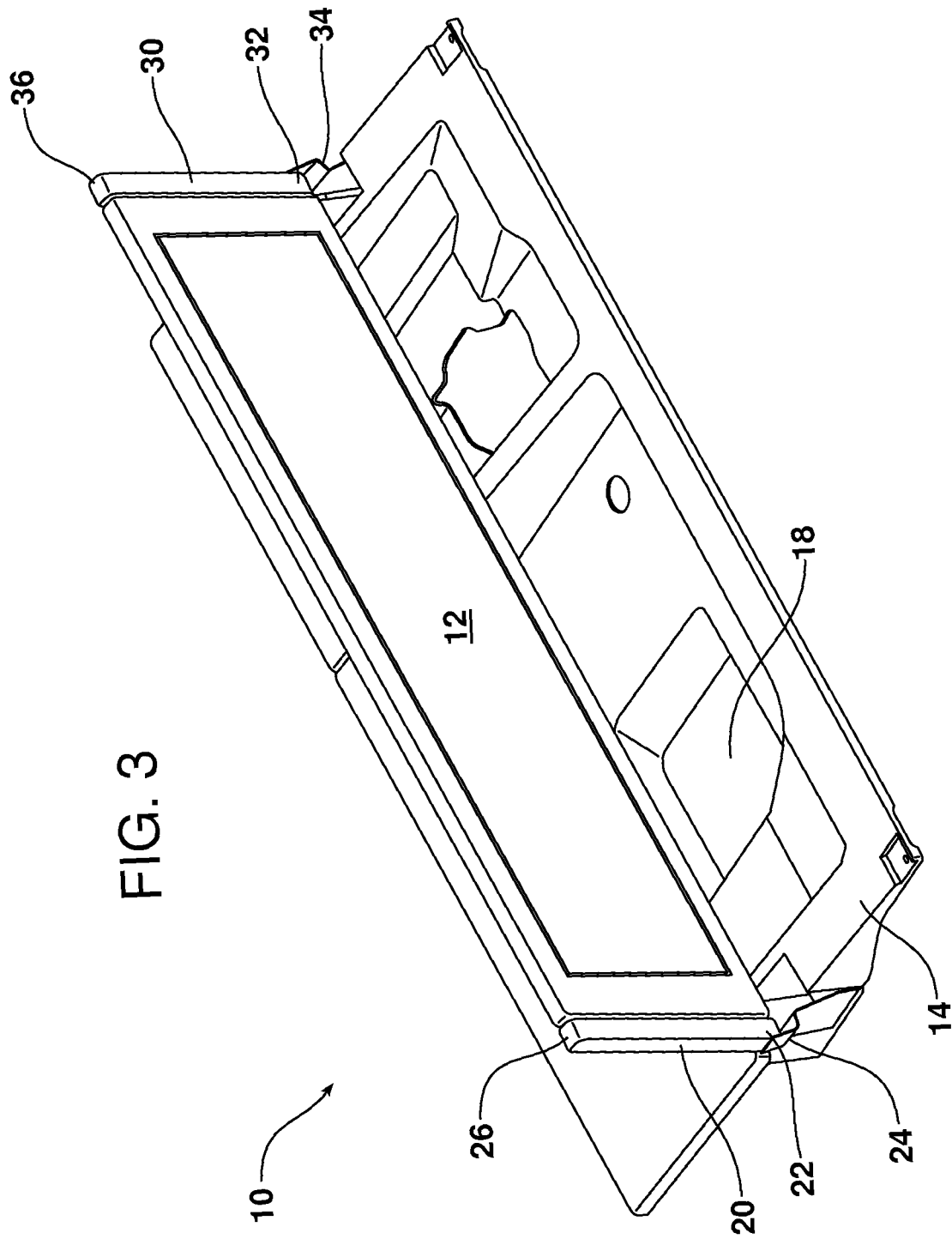
FIG. 3 is a perspective view of the cargo management system embodiment illustrated in FIG. 2, but showing the swing arm assembly and dynamic load floor pivoted into a vehicle forward position so as to expose the underlying load.

As illustrated in FIG. 3, when it is desired to pivot the dynamic load floor 12 in a motor vehicle forward direction to access the storage tub 14 and provide a forward bulkhead, the two swing arms 20, 30 are pivoted about the anchor points 24, 34 and the sets of projections 40, 42 are maintained in the sets of open notches 44, 46.

In contrast, as illustrated in FIG. 4, when one desires to pivot the dynamic load floor 12 in a vehicle rearward direction to open the storage tub 14 and provide a rear bulkhead to the storage area A, the dynamic load floor 12 is pivoted with respect to the two swing arms 20, 30 which remain in the lowermost position resting on the storage tub 14. Here it should be appreciated that the first and second sets of projections 40, 42 have been withdrawn from the first second set of open notches 44, 46 in the first and second swing arms 20, 30. In this position, the dynamic load floor 12 functions to prevent any items from falling out of the lift gate of the motor vehicle when the lift gate is opened.

As illustrated in FIG. 5, the dynamic load floor 12 may also be positioned in a configuration wherein the load floor functions as a shelf. As illustrated, in this configuration, the user pivots the swing arms 20, 30 in a vehicle forward direction about the anchor points 24, 34 with the storage tub 14 while the dynamic load floor 12 is pivoted "over center" in the direction of action arrow B so as to rest in a substantially horizontal plane spaced above the storage tub 14. In one possible embodiment, stops (not shown) formed at the pivotal connection of the dynamic load floor to the swing arms 20, 30 hold the dynamic load floor in this horizontal position.

Reference is now made FIGS. 10a and 10b illustrating a hook 48 that is pivotally mounted in a side wall W of the storage area A and is displaceable between a stowed position illustrated in FIG. 10a and a use position illustrated in FIG. 10b. In the stowed position, the hook 48 is pivoted and received in a recess 50 in a side wall W where it is protected from potentially catching on cargo and provides a more aesthetically pleasing appearance. In contrast, when in the use position illustrated in FIG. 10b, the hook is pivoted to project from the recess 50. As illustrated, the hook 48 receives either of the first or second set of projections 40, 42 depending upon the sidewall in which the hook 48 is located. Thus, the hook 48 supports the end of the dynamic load floor 12 opposite the connection to the swing arm assembly 16 so as to securely and stably hold the dynamic load floor 12 in a horizontal position to function as a shelf. Here it should be appreciated that a first hook 48 (hidden from view in figure) is provided in the first sidewall W1 while a second hook 48 is provided in the second sidewall W2 of the motor vehicle (FIG. 1). Accordingly, it should be appreciated that the first hook 48 is in position to receive one of the first projections 40 while the second hook 48 is in position to receive one of the second projections 42.

As further illustrated in FIG. 5, a flip up shelf bulkhead 52 is pivotally connected to the dynamic load floor 12 by a series of hinges 54. The flip up shelf bulkhead 52 is selectively displaceable between a retracted position where it is held flat against the dynamic load floor 12 (phantom line shown in FIG. 1) where the flip up shelf bulkhead is concealed underneath the dynamic load floor 12 above the storage tub 14 and a deployed position where the flip up shelf bulkhead is substantially perpendicular to the dynamic load floor (see FIG. 5). Here it should be appreciated that the flip up shelf bulkhead 52 acts as a forward wall to help maintain items on the dynamic load floor 12 when the dynamic load floor is configured to function as a shelf as illustrated in FIG. 5. In order to achieve this functionality, it should be appreciated that the flip up shelf bulkhead 52 and the swing arms 20, 30 of the swing arm assembly 16 are all pivotally connected to the dynamic load floor 12 at the same end of the dynamic load floor.

As illustrated in FIGS. 2-4, the cargo management system 10 also includes a first flipper panel 56 and a second flipper panel 58 pivotally connected to the storage tub 14 and carried vehicle forward of the dynamic load floor 12 between the dynamic load floor and a rear seat R of the motor vehicle M. The flipper panels 56, 58 are both biased by springs 60, 62 so as to close at the gap between the dynamic load floor 12 and the rear seat R when the seats are in the down position. In the illustrated embodiment, the flipper panels 56, 58 are configured to match a 60/40 rear seat configuration. The width of the individual flipper panels 56, 58 may be altered to match substantially any other seat configuration including, for example, a 50/50 configuration. Of course, it should be appreciated that a single flipper panel may also be provided where the motor vehicle includes a single rear seat extending all the way across the motor vehicle.

Reference is now made to FIGS. 6-9 illustrating a second embodiment of the cargo management system 10. This embodiment of the cargo management system 10 includes all of the structures described with respect to the first embodiment illustrated in FIGS. 1-5 and for purposes of simplicity they are identified with the same reference numbers in the drawing FIGS. 6-9. In addition to these structures, it should be appreciated that the second embodiment of the cargo management system 10 includes a larger storage tub 14. Further, a cargo storage door 64 is pivotally connected to the storage tub 14 at a position vehicle forward of the dynamic load floor 12 and vehicle rearward of the flipper panels 56, 58. FIG. 6 illustrates one configuration of the second embodiment of the cargo management system 10 wherein the cargo storage door 64 and the dynamic load floor 12 are both closed over the storage tub 14 and lie in the same plane with the swing arms 20, 30 flush with the floor F of the motor vehicle M.

As illustrated in FIG. 7, the cargo storage door 64 has been pivoted vehicle forward to open the forward portion of the storage compartment 18 in the storage tub 14. Here it should be appreciated that the cargo storage door 64 effectively functions as a forward bulkhead.

Reference is now made to FIG. 8 illustrating yet another configuration of the second embodiment of the cargo management system 10 wherein the dynamic load floor 12 has been pivoted vehicle forward to form a divider or partition. Here the portion of the storage area A behind the vertically oriented dynamic load floor 12 is open to the storage compartment 18 in the storage tub 14 while the portion of the storage area A forward of the dynamic load floor 12 is covered by the cargo storage door 64 which remains in a closed position.

While not illustrated, it should be appreciated that the cargo storage door 64 could be pivoted forward to form a forward bulkhead as illustrated in FIG. 7 at the same time as the dynamic load floor 12 is pivoted rearward to form a rearward bulkhead as illustrated in FIG. 4, thus containing or holding cargo in the storage compartment 18 between rear and forward bulkheads simultaneously.

Finally, FIG. 9 illustrates yet another configuration of the second embodiment of the cargo management system 10 wherein the dynamic load floor 12 has been placed into the shelf configuration as previously described in detail and illustrated in FIG. 5 for the first embodiment.

The foregoing has been presented for purposes of illustration and description. It is not intended to be exhaustive or to limit the embodiments to the process form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A cargo management system for a storage area of a motor vehicle, comprising:
    a dynamic load floor having opposed side edges;
    a storage tub underlying said dynamic load floor;
    a swing arm assembly carrying said dynamic load floor, said swing arm assembly allowing said dynamic load floor to be selectively positioned into multiple configurations, said swing arm assembly including first and second swing arms, said swing arms extending along an entire length of respective opposed side edges of the dynamic load floor in a first position, wherein said first swing arm has a first end pivotally connected to a first anchor point on said storage tub and a second end pivotally connected to the first opposed side edge of said dynamic load floor.

2. The cargo management system of claim 1, wherein said second swing arm has a third end pivotally connected to a second anchor point on said storage tub and a fourth end pivotally connected to the second opposed side edge of said dynamic load floor.

3. The cargo management system of claim 2, wherein said dynamic load floor includes a first projection on said first opposed side edge and said first swing arm includes a first open notch for receiving said first projection whereby said first swing arm and said dynamic load floor are held in a single plane.

4. The cargo management system of claim 3, wherein said dynamic load floor includes a second projection on said second opposed side edge and said second swing arm includes a second open notch for receiving said second projection whereby said second swing arm and said dynamic load floor are held in said single plane.

5. The cargo management system of claim 4, further including a first hook in a first sidewall of said storage area and a second hook in a second sidewall of said storage area whereby when said dynamic load floor is pivoted with respect to said swing arm assembly into a second position oriented at an angle to said first swing arm and said second swing arms to form a shelf, said first projection being received in said first hook and said second projection being received in said second hook.

6. The cargo management system of claim 5, wherein said first hook is pivotally mounted to said first sidewall and displaceable between a stowed position within a first cavity of said sidewall and a use position to receive said first projection.

7. The cargo management system of claim 6, wherein said second hook is pivotally mounted to said second sidewall and displaceable between a stowed position within a second cavity of said second sidewall and a use position to receive said second projection.

8. The cargo management system of claim 7, further including a first flipper panel carried vehicle forward of said dynamic load floor between said dynamic load floor and a rear seat of said vehicle.

9. The cargo management system of claim 8, further including a second flipper panel carried vehicle forward of said dynamic load floor adjacent said first flipper panel between said dynamic load floor and said rear seat of said motor vehicle.

10. The cargo management system of claim 9, further including a flip up shelf bulkhead pivotally connected to said dynamic load floor and displaceable between a retracted position flat against said dynamic load floor and a deployed position substantially perpendicular to said dynamic load floor.

11. The cargo management system of claim 10, wherein said flip up shelf bulkhead and said swing arm assembly are both pivotally connected to said dynamic load floor at a same end of said dynamic load floor.

12. The cargo management system of claim 11, wherein said flip up shelf bulkhead in said retracted position is hidden from view under said dynamic load floor when said dynamic load floor is in a closed position overlying and covering and resting on said storage tub.

13. The cargo management system of claim 1, further including a flip up shelf bulkhead pivotally connected to said dynamic load floor and displaceable between a retracted position flat against said dynamic load floor and a deployed position substantially perpendicular to said dynamic load floor.

14. The cargo management system of claim 13, wherein said flip up shelf bulkhead and said swing arm assembly are both pivotally connected to said dynamic load floor at a same end of said dynamic load floor.

15. The cargo management system of claim 14, wherein said flip up shelf bulkhead in said retracted position is hidden from view under said dynamic load floor when said dynamic load floor is in a closed position overlying and covering and resting on said storage tub.

16. The cargo management system of claim 1, further including a cargo storage door pivotally connected to said storage tub at a position vehicle forward of said dynamic load floor.

17. The cargo management system of claim 16, further including a first flipper panel carried vehicle forward of said cargo storage door between said cargo storage door and a rear seat of the motor vehicle.

18. A cargo management system for a storage area of a motor vehicle, comprising:
   a dynamic load floor displaceable between a floor position and a shelf position;
   a storage tub underlying said dynamic load floor;
   a swing arm assembly carrying said dynamic load floor, said swing arm assembly allowing said dynamic load floor to be selectively positioned into multiple configurations, said swing arm assembly including first and second swing arms, wherein said first swing arm has a first end pivotally connected to a first anchor point on said storage tub and a second end pivotally connected to the dynamic load floor; and
   a flip up shelf bulkhead pivotally connected to said dynamic load floor and displaceable between a retracted position flat against said dynamic load floor and a deployed position substantially perpendicular to said dynamic load floor so as to form a forward wall when said dynamic load floor is in said shelf position.

* * * * *